United States Patent Office 2,733,246
Patented Jan. 31, 1956

2,733,246
PROCESS OF PRODUCING ISONICOTINIC ACID

Martin Everett Hultquist, Bound Brook, N. J., assignor to American Cyanamid Company, New York, N. Y., a corporation of Maine No Drawing. Application June 28, 1952,
Serial No. 296,245

10 Claims. (Cl. 260—295)

This invention relates to a process of preparing isonicotinic acid. In particular this invention relates to a process of preparing isonicotinic acid from the pyrophthalone of gamma picoline having the following formula

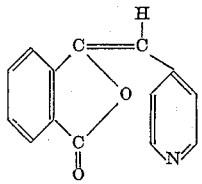

wherein said pyrophthalone is heated with a strongly acid oxidizing agent, such as nitric acid, sulfuric acid or mixtures thereof, to oxidize said pyrophthalone and produce an acid reaction mixture containing isonicotinic acid and phthalic acid and the isonicotinic acid is recovered from the said reaction mixture, as a substantially pure acid; all as is more fully hereinafter described and claimed.

In the past, isonicotinic acid has been obtained principally by the oxidation of gamma picoline. This has involved a considerable problem because gamma picoline does not occur pure but is obtained as a mixture of beta and gamma picolines which are difficult to separate because of their close boiling point. This has increased the cost of gamma picoline, and therefore, isonicotinic acid, which has assumed a great deal of importance in conjunction with the manufacture of a tuburculostatic drug, isonicotinic acid hydrazide.

According to the present invention, we have found that the pyrophthalone of gamma picoline can be very readily oxidized in good yields to isonicotinic acid. The oxidation may be effected with the ordinary oxidizing agents, such as nitric and sulfuric acids, or even nitric acid alone. The gamma picoline pyrophthalone is obtained by reacting mixed beta and gamma picolines with phthalic anhydride. The preparation of the pyrophthalone is described in U. S. Patent 2,430,804 in connection with a process for obtaining pure beta picoline free from gamma picolines. The production of the pyrophthalone was for the purpose of transforming the gamma picoline into a form in which it had a very different boiling point from beta picoline.

The process of the present invention may be used with the separated pyrophthalone which is an advantageous method when the pyrophthalone has been produced in conjunction with the preparation of beta picoline. Another modification of the present invention involves the oxidation of a crude mixture of pyrophthalone and beta picoline as it has been found that the pyrophthalone oxidizes so much more easily that it is possible to transform it in good yield into isonicotinic acid without substantial oxidation of the beta picoline. It is, of course, also possible to use more drastic oxidation procedures which will oxidize both the pyrophthalone and the beta picoline to a mixture of isonicotinic acid and nicotinic acid, in which case, however, it becomes necessary to separate the two acids which involves further steps. The question of which modification of the present invention should be used is therefore largely an economic matter and it is an advantage of the present process that it is very flexible and the optimum compromise for lowest cost may be used.

As it has been pointed out above, the oxidation procedure may be effected by the ordinary oxidizing agents, such as mixed nitric and sulfuric acids. It is, however, an advantage that other oxidation processes may be used, for example, the use of nitric acid, sulfuric acid and sulfur trioxide with a catalyst such as ferric bromide which permits effecting a considerable amount of the oxidation by utilizing $SO_3$ instead of the more expensive nitric acid. The ready oxidizability of the pyrophthalone also permits using milder oxidizing conditions, such as nitric acid alone. Such milder conditions are sometmes of advantage where it is desired to oxidize a crude reaction mixture of the pyrophthalone and beta picoline, as nitric acid alone does not substantially oxidize the beta picoline and it is thus possible to obtain from the crude mixture isonicotinic acid without contamination by nicotinic acid. Beta picoline, of course, is readily separated from the isonicotinic acid because of its very different chemical and physical characteristics.

The oxidation reaction results in the production of phthalic acid. The question of whether this phthalic acid should be recovered is largely one of economics. Phthalic anhydride is very cheap and under certain production set-ups it is preferable to throw away the phthalic acid obtained as a by-product in the oxidation. Under other conditions, however, it is worthwhile to recover the phthalic acid formed and the present invention may be used with or without recovery of phthalic acid.

The invention will be described in greater detail in conjunction with the following specific examples, the parts being by weight unless otherwise specified.

Example 1

To a mixture of 60 parts by volume of 5–N sulfuric acid and 52 parts of 70% nitric acid heated to 100° C., there is added 36 parts of pyrophthalone of gamma picoline. Considerable foaming with evolution of nitric oxide fumes results. The heating is continued at 100 to 110° C. after which 15 additional parts of 70% nitric acid is added and the mixture boiled gently at 110 to 120° C. until the reaction is complete. The reaction mixture is then cooled to 20° C. and the phthalic acid which precipitates out, filtered, washed with water and dried. The recovery of phthalic acid is very high, in excess of 90%.

The filtrate and water washings from the phthalic anhydride precipitate are combined and brought to a pH of 3.5 by aqueous ammonium hydroxide solution. On cooling to 20° C., a precipitate of isonicotinic acid is obtained which is filtered, washed with water and dried. A good yield of a high-grade product results.

Example 2

A mixture of 95.5 parts of mixed picolines, containing 55.3% of gamma picoline and 36.6% of beta picoline, two parts of anhydrous zinc chloride and 93 parts of phthalic anhydride is heated under reflux (170 to 180° C.) until reaction is substantially stopped.

The reaction mixture is cooled slightly and is added to a mixture of 200 parts by volume of 5-N sulfuric acid, 170 parts of 70% nitric acid and 30 parts of water, the mixture being heated to 100° C. A vigorous evolution of oxides of nitrogen takes place at first. The mixture is then boiled, evaporating it until the internal temperature reaches 130° C. The hot mixture is then diluted to 250 parts by volume with water, cooled to 20° C. and phthalic acid which precipitates, filtered off and washed with water and dried. The yield of phthalic acid while good is not quite as high as in Example 1.

The filtrate and washings of the phthalic acid precipitate are brought to a pH of 3.5, cooled to 20° C. and isonicotinic acid precipitates out. This is filtered, washed with water and dried. A good product is obtained. The filtrate from the isonicotinic acid precipitate is then brought to a pH of 8 to 9 with an aqueous sodium hydroxide solution and the unreacted beta picoline distilled off with steam. The beta picoline recovered is not dry, but if it is to be used for oxidation to nicotinic acid, this is immaterial; however, if desired, the beta picoline may be dried. Analysis of this solution shows recovery of 12 parts picolines; 4.6 parts being gamma-picoline, 7.4 parts beta picoline, and 0.6 part 2,6-lutidine.

*Example 3*

The mixture of 175 parts of phthalic anhydride, 167 parts of mixed picolines, as described in the preceding example, is heated under reflux until the reaction is substantially complete. The mixture is then added to a solution of 350 parts of 70% nitric acid and 50 parts of water maintained at 80 to 100° C. The addition is gradual as there is a vigorous evolution of nitric oxide. After evolution ceases, the mixture is maintained at the temperature for some time and then is gradually raised to 125 to 130° C. by evaporating water at which temperature the heating is continued until the reaction is complete. To the reaction mixture, there is then added 200 parts of water and the mixture is cooled to 20° C. Phthalic acid is obtained which is filtered, washed and dried.

The filtrate and the washings from the phthalic acid filter cake are then evaporated until they have a boiling point of 130 to 150° C. and are heated with an additional small amount of 70% nitric acid which is added to maintain the boiling temperature. This results in an additional recovery of isonicotinic acid as the initial oxidation results in a certain amount of splitting of the pyrophthalone before oxidation takes place. The solution is diluted to 400 parts by volume by adding water and brought to a pH of 3.5 with 50% aqueous sodium hydroxide solution. It is then cooled with stirring to permit crystallization of the isonicotinic acid which is filtered, washed with water and dried. An excellent product is obtained.

The filtrate from the isonicotinic acid recovery is brought to a pH of 8 to 9 by means of sodium hydroxide solution and unreacted picolines in water distilled off. Analysis shows recovery of 66.8 parts picolines, containing 61% beta-picoline, 34.5% gamma-picoline, and 4.5% 2,6-lutidine.

I claim:
1. As a method of producing isonicotinic acid from the pyrophthalone of gamma picoline having the formula:

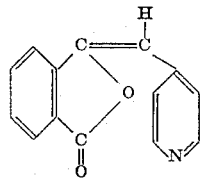

the method which comprises (1) heating said pyrophthalone with a strongly acid oxidizing agent to oxidize said pyrophthalone and produce an acid reaction mixture containing isonicotinic acid and phthalic acid and (2) recovering the isonicotinic acid so produced.

2. The method of claim 1 wherein the phthalic acid is removed from the acid reaction mixture prior to recovering the isonicotinic acid therefrom.

3. The method of claim 1 wherein the reaction mixture obtained in step 1 thereof is diluted with water and cooled to precipitate the phthalic acid and the precipitated phthalic acid is separated therefrom by filtration.

4. The process of claim 3 wherein the filtrate so obtained is partially neutralized to a pH of 3.5 to precipitate the isonicotinic acid and the precipitated isonicotinic acid is separated by filtration.

5. The process of claim 1 wherein the strongly acid oxidizing agent is nitric acid.

6. The process of claim 1 wherein the strongly acid oxidizing agent is a mixture of nitric and sulfuric acids.

7. As an improved method of producing isonicotinic acid from a mixture of picolines containing gamma picoline and beta picoline, the improved method which comprises (1) reacting phthalic anhydride with the mixed picolines to convert the gamma picoline into the pyrophthalone thereof, (2) heating the reaction mixture so obtained with a strongly acid oxidizing agent at a temperature not exceeding 130° C. to oxidize the said pyrophthalone without oxidizing the beta picoline and produce an acid reaction mixture containing isonicotinic acid, phthalic acd and unreacted picolines and (3) recovering the isonicotinic acid from the acid reaction mixture so obtained.

8. The method of claim 7 wherein the said strongly acid oxidizing agent is nitric acid.

9. The method of claim 7 wherein the said strongly acid oxidizing agent is the mixture of nitric and sulfuric acids.

10. The method of claim 7 wherein the acid reaction mixture obtained in step 2 thereof is diluted with water and cooled to precipitate the phthalic acid therefrom, the precipitated phthalic acid is separated by filtration, the filtrate so obtained is partially neutralized to a pH of 3.5 to precipitate the isonicotinic acid, the precipitate isonicotinic acid is separated by filtration, the filtrate so obtained is neutralized to a pH between 8 and 9 and the so neutralized filtrate is steam distilled to recover the unreacted picolines.

References Cited in the file of this patent

UNITED STATES PATENTS

| | | |
|---|---|---|
| 2,300,741 | Cislak et al. | Nov. 3, 1942 |
| 2,430,804 | Cislak et al. | Nov. 11, 1947 |
| 2,449,906 | Mueller | Sept. 21, 1948 |
| 2,475,969 | Larrison | July 12, 1949 |
| 2,505,568 | Mueller | Apr. 25, 1950 |
| 2,513,099 | Mueller | June 27, 1950 |
| 2,522,163 | Cislak et al. | Sept. 12, 1950 |